US010445274B2

(12) United States Patent
Lee (10) Patent No.: US 10,445,274 B2
(45) Date of Patent: Oct. 15, 2019

(54) UNIVERSAL SERIAL BUS (USB) HUB FOR CONNECTING DIFFERENT PORT TYPES AND METHOD THEREOF

(71) Applicant: GENESYS LOGIC, INC., New Taipei (TW)

(72) Inventor: Wei-te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 359 days.

(21) Appl. No.: 14/981,987

(22) Filed: Dec. 29, 2015

(65) Prior Publication Data

US 2016/0350251 A1  Dec. 1, 2016

(30) Foreign Application Priority Data

May 29, 2015 (TW) .............................. 104117491 A (51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
USPC ................................... 710/33, 38, 305, 313
See application file for complete search history.

(56) References Cited

U.S. PATENT DOCUMENTS

| | | | | |
|---|---|---|---|---|
| 6,363,085 B1 * | 3/2002 | Samuels | ............. | G06F 13/4045 370/242 |
| 6,732,218 B2 * | 5/2004 | Overtoom | ........... | G06F 13/4022 710/311 |
| 7,346,728 B1 * | 3/2008 | Jackson | .............. | G06F 13/4045 710/300 |
| 7,480,753 B2 | 1/2009 | Bohm et al. | | |
| 8,055,919 B2 * | 11/2011 | Magnusson | ............. | G06F 1/266 455/573 |
| 2007/0118674 A1 * | 5/2007 | Ulenas | .................. | G06F 13/387 710/305 |
| 2008/0224658 A1 * | 9/2008 | Borjeson | ............... | G06F 13/385 320/114 |

(Continued)

FOREIGN PATENT DOCUMENTS

| | | |
|---|---|---|
| CN | 1672139 A | 9/2005 |
| CN | 102176702 A | 9/2011 |

(Continued)

*Primary Examiner* — Farley Abad
*Assistant Examiner* — Henry W Yu
(74) *Attorney, Agent, or Firm* — Mark M. Friedman (57) ABSTRACT

A universal serial bus (USB) hub for connecting different port types and method thereof are provided. In one embodiment, USB controller detects the power level of each dynamic port to determine whether one of the dynamic ports is connected to the host device wherein the connected dynamic port is defined as upstream port. The disconnected dynamic port of the dynamic ports is defined as downstream port to be connected to the peripheral device. In another embodiment, the USB controller selectively disables the disconnected dynamic port of the dynamic ports. The present invention improves the application flexibility of connecting wire between the hub and the host device.

21 Claims, 3 Drawing Sheets

(56) References Cited

U.S. PATENT DOCUMENTS

| | | | | |
|---|---|---|---|---|
| 2011/0246678 A1* | 10/2011 | Wu | ......................... | G06F 3/038 |
| | | | | 710/11 |
| 2013/0013936 A1* | 1/2013 | Lin | ......................... | G06F 1/266 |
| | | | | 713/300 |
| 2014/0208134 A1* | 7/2014 | Waters | ................... | G06F 13/385 |
| | | | | 713/310 |
| 2015/0356034 A1* | 12/2015 | Pamley | ............... | G06F 13/1684 |
| | | | | 710/308 |
| 2016/0163480 A1* | 6/2016 | Lester | ..................... | G06F 13/00 |
| | | | | 713/300 |

FOREIGN PATENT DOCUMENTS

| | | |
|---|---|---|
| CN | 102446154 A | 5/2012 |
| CN | 205452732 U | 8/2016 |
| TW | 493769 | 7/2002 |
| TW | 340909 | 4/2011 |
| TW | 365380 | 6/2012 |
| TW | 494348 | 1/2015 |
| TW | 517460 | 2/2016 |

\* cited by examiner

UNIVERSAL SERIAL BUS (USB) HUB FOR CONNECTING DIFFERENT PORT TYPES AND METHOD THEREOF

BACKGROUND OF THE INVENTION

Field of Invention

The present invention relates to a hub device and method thereof, and more particularly to a universal serial bus (USB) hub for connecting different port types and method thereof.

Description of Prior Art

With the rapid development of information technology, electronic products, e.g. notebook computers, mobile phones and mobile tablets of hand-held electronic devices, are widely used increasingly to be found almost everywhere. Since the characteristics of the hand-held electronic devices are portable and used anywhere and at any time and for the purpose of a large amount data transmission between the hand-held electronic devices by mutual connections, the hand-held electronic devices employ a USB connection wire to be inserted to the downstream connection ports of the hub wherein the upstream connection port of the hub is connected to the host unit so that the hand-held electronic devices transmit the data to the host unit or receive the data to the host unit by way of the USB protocol of the hub.

Conventionally, a USB connection wire is used to connect the hub to the host unit wherein two end portions of the USB connection wire are composed of standard type-A connectors. Therefore, the USB connection wire is only applicable to the upstream connection ports of the hub equipped with standard type-A connectors. However, when one of the end portions of the USB connection wire is standard type-A connector and the other end portion is another type except the standard type-A connector, the other end portion cannot be used in the upstream connection port of the host unit merely equipped with an standard type-A connector if the one of the end portions of the standard type-A connector has been connected to the host unit. In other words, the type of the connection port of the host unit makes a limit to the utilization flexibility of the hub, resulting in a greater restriction between the hub and the host unit. Consequently, there is a need to develop a novel hub to solve the aforementioned problem.

SUMMARY OF THE INVENTION

One objective of the present invention is to provide a universal serial bus (USB) hub for connecting different port types and method thereof by detecting a power level of each dynamic connection port to determine whether the power level of the one of at least two different types of dynamic connection ports connected to the host unit is greater than a predetermined level. The dynamic connection port connected to the host unit is defined as a upstream connection port and another dynamic connection port disconnected from the host unit is defined as a downstream connection port for the peripheral device. In another case, the USB controller selectively disables the dynamic connection port disconnected from the host unit for improving the utilization flexibility of the connection wire between the hub device and host unit.

According to the above objective, a first embodiment of the present invention sets forth a USB hub for connecting different port types. The USB hub for connecting different port types, the USB hub comprises: a plurality of dynamic connection ports comprising at least two different types of dynamic connection ports wherein one of at least two different types of dynamic connection ports is used to connect to a host unit; a USB controller connected to the dynamic connection ports, for detecting a power level of each dynamic connection port to determine whether the power level of the one of at least two different types of dynamic connection ports connected to the host unit is greater than a predetermined level; a upstream control circuit connected to the USB controller and the dynamic connection port connected to the host unit, wherein the USB controller controls the dynamic connection port connected to the host unit for either receiving information from the host unit or transmitting information to the host unit and analyzes the received information; a plurality of downstream connection ports, for being connected to a plurality of peripheral devices respectively; a plurality of downstream control circuits connected to the USB controller and the downstream connection ports, wherein the downstream control circuits either transmits or receive the received or transmitted information of the upstream control circuit by way of the downstream connection ports; and a switch module connected to the dynamic connection ports, the USB controller, the upstream control circuit, the downstream connection ports and the downstream control circuits, wherein when the USB controller detects that the host unit is not connected to another of the at least two different types of dynamic connection ports, the switch module switches the another dynamic connection port disconnected from the host unit to another connection port and the another dynamic connection port is capable of connecting to one of the downstream control circuits to allow the another dynamic connection port to be connected to another peripheral device.

In one embodiment, the dynamic connection ports comprise a standard type-A connection port and a type-C connection port which are compatible to a USB protocol and the USB controller does not configure the dynamic connection ports to be the standard type-A connection port or the type-C connection port in advance.

In one embodiment, the dynamic connection ports comprise a standard type-A connection port and a type-C connection port which are compatible to a USB protocol and the USB controller configures the dynamic connection ports to be the standard type-A connection port and/or the type-C connection port in advance.

In one embodiment, when the USB controller detects that the power level of each dynamic connection port is greater than the predetermined level, the USB controller disables the upstream control circuit and the downstream control circuits for inactivating the downstream control circuits not to transmit or receive the information from the upstream control circuit.

In one embodiment, the USB hub for connecting different port types further comprises an indication device connected to the USB controller for indicating the dynamic connection ports of the USB hub in an error status.

In one embodiment, the USB controller is capable of assigning one of the dynamic connection ports as a connection port to be connected to the host unit.

In one embodiment, the power level is a level value of a VBUS pin defined by a USB interface of the host unit.

In one embodiment, when the USB controller confirms that the another dynamic connection port is disconnected from the host unit, the switch module disables the another dynamic connection port to inactivate the another dynamic connection port.

A second embodiment of the present invention sets forth a USB hub for connecting different port types. The USB hub for connecting different port types, the USB hub comprises: a first upstream connection port comprising a first type of port interface coupled to a host unit; a second upstream connection port comprising a second type of port interface which is different from the first type of port interface and is coupled to the host unit; a USB controller connected to the first upstream connection port and the second upstream connection port, for detecting a plurality of power levels of the first upstream connection port and the second upstream connection port respectively to determine whether the power levels of the first upstream connection port and the second upstream connection port connected to the host unit is greater than a predetermined level; a upstream control circuit connected to the USB controller and the first upstream connection port and the second upstream connection port connected to the host unit, wherein the USB controller controls the first upstream connection port and the second upstream connection port connected to the host unit for either receiving information from the host unit or transmitting information to the host unit and analyzes the received information; a plurality of downstream connection ports, for being connected to a plurality of peripheral devices respectively; a plurality of downstream control circuits connected to the USB controller and the downstream connection ports, wherein the downstream control circuits either transmits or receive the received or transmitted information of the upstream control circuit by way of the downstream connection ports; and a switch module connected to the first upstream connection port and the second upstream connection port and the USB controller, wherein when the USB controller detects that the host unit is not connected to the first upstream connection port, the switch module switches the upstream control circuit to be connected to the first upstream connection port which is connected to the host unit. In one embodiment, the power level is a level value of a VBUS pin defined by a USB interface of the host unit. In one embodiment, when the USB controller confirms that the second upstream connection port is disconnected from the host unit, the switch module disables the second upstream connection port to inactivate the second upstream connection port.

In the present invention, a connection method of USB hub to connect different port types, the connection method comprises the steps of: connecting one of a plurality of different types of dynamic connection ports to a host unit wherein the dynamic connection ports comprise at least two different types of dynamic connection ports; detecting a power level of each dynamic connection port by way of a USB controller to determine whether the power level of the one of at least two different types of dynamic connection ports connected to the host unit is greater than a predetermined level; controlling the dynamic connection port connected to the host unit by way of the USB controller for either receiving information from the host unit or transmitting information to the host unit; connecting to a plurality of peripheral devices to a plurality of downstream connection ports respectively; either transmitting or receiving the received or transmitted information of a upstream control circuit using a plurality of downstream control circuits by way of the downstream connection ports; and connecting to one of the downstream control circuits to allow another dynamic connection port to be connected to another peripheral device by way of the another dynamic connection port when the USB controller detects that the host unit is not connected to another of the at least two different types of dynamic connection ports.

In one embodiment, during the step of connecting one of a plurality of different types of dynamic connection ports to the host unit, the dynamic connection ports comprise a standard type-A connection port and a type-C connection port which are compatible to a USB protocol and the USB controller does not configure the dynamic connection ports to be the standard type-A connection port or the type-C connection port in advance.

In one embodiment, during the step of connecting one of a plurality of different types of dynamic connection ports to the host unit, the dynamic connection ports comprise a standard type-A connection port and a type-C connection port which are compatible to a USB protocol and the USB controller configures the dynamic connection ports to be the standard type-A connection port and/or the type-C connection port in advance.

In one embodiment, during the step of detecting the power level of each dynamic connection port by way of the USB controller, when the USB controller detects that the power level of each dynamic connection port is greater than the predetermined level, the USB controller disables the upstream control circuit and the downstream control circuits for inactivating the downstream control circuits not to transmit or receive the information from the upstream control circuit.

In one embodiment, during the step of disabling the upstream control circuit and the downstream control circuits by the USB controller, further comprising a step of indicating the dynamic connection ports of the USB hub in an error status by way of an indication device.

In one embodiment, during the step of connecting one of a plurality of different types of dynamic connection ports to the host unit, the USB controller is capable of assigning one of the dynamic connection ports as a connection port to be connected to the host unit.

In one embodiment, the power level is a level value of a VBUS pin defined by a USB interface of the host unit.

In one embodiment, when the USB controller confirms that the another dynamic connection port is disconnected from the host unit, the switch module disables the another dynamic connection port to inactivate the another dynamic connection port.

DETAILED DESCRIPTION OF THE PREFERRED EMBODIMENTS

Figure 1:
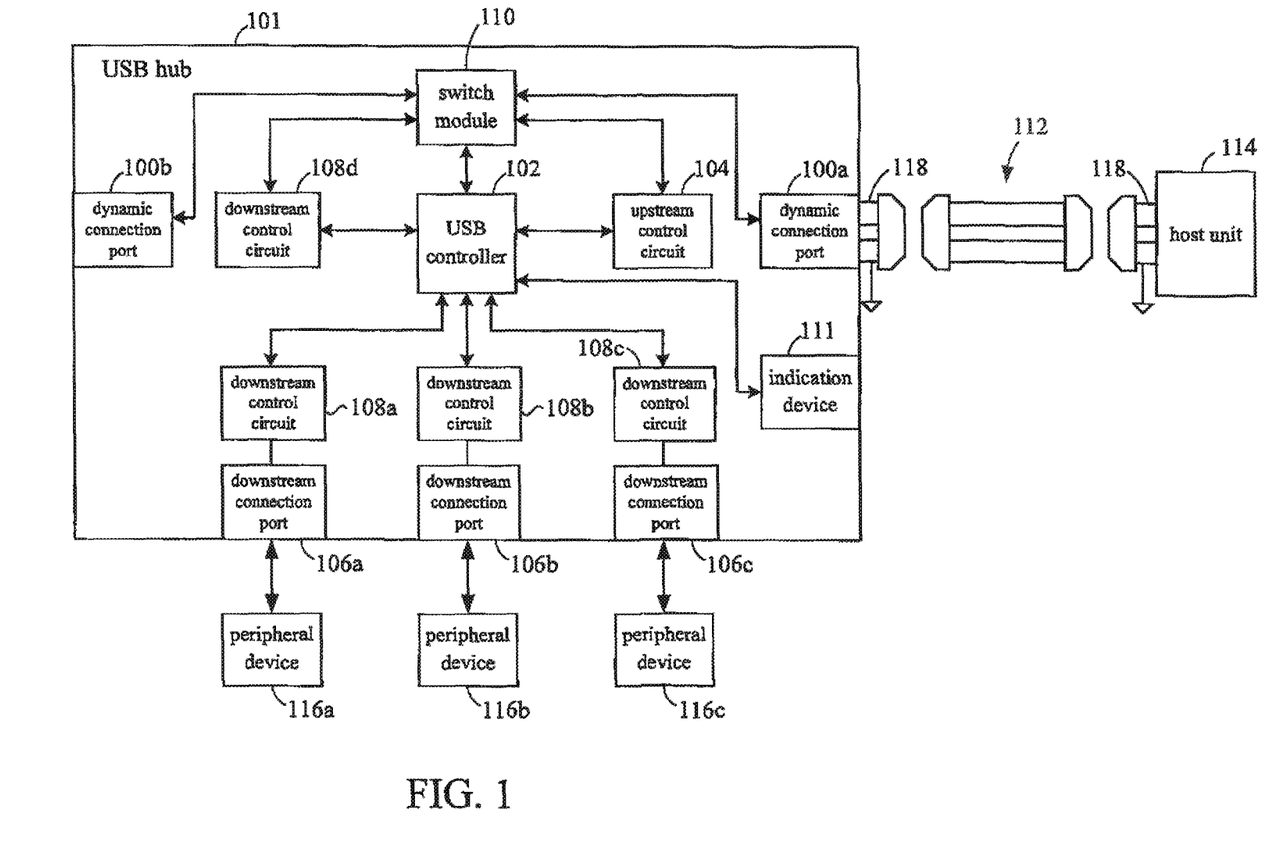
FIG. 1 is a schematic block diagram of a universal serial bus (USB) hub for connecting different port types according to a first embodiment of the present invention.

Refer to FIG. 1, which is a schematic block diagram of a universal serial bus (USB) hub 101 for connecting different port types according to a first embodiment of the present invention. The USB hub 101 comprises a plurality of dynamic connection ports 100a, 100b, a USB controller 102, a upstream control circuit 104, a plurality of downstream connection ports 106a, 106b, 106c, a plurality of downstream control circuits 108a, 108b, 108c, 108d, a switch module 110 and an indication device 111. One of the dynamic connection ports 100*a*, 100*b* in the USB hub 101 is connected to the host unit 114 via a connection wire 112. The USB controller 102 is connected to the upstream control circuit 104, the downstream control circuits 108*a*, 108*b*, 108*c*, the switch module 110 and the indication device 111.

As shown in FIG. 1, the dynamic connection ports 100*a*, 100*b* comprises at least two different types of dynamic connection ports 100*a*, 100*b* wherein one of at least two different types of dynamic connection ports 100*a*, a00*b* is used to connect to a host unit 114. In this case, two different types of dynamic connection ports 100*a*, 100*b* are used, but not limited. The USB controller 102 connected to the dynamic connection ports 100*a*, 100*b* detects a power level of each dynamic connection port 100*a*, 100*b* to determine whether the power level of the one of at least two different types of dynamic connection ports 100*a*, 100*b* connected to the host unit 114 is greater than a predetermined level. The upstream control circuit 104 is connected to the USB controller 102 and the dynamic connection port 110*a* connected to the host unit 114, wherein the USB controller 102 controls the dynamic connection port 110*a* connected to the host unit 114 for either receiving information from the host unit 114 or transmitting information to the host unit 114 and analyzes the received information. In FIG. 1, the dynamic connection port 110*a* is connected to the host unit 114.

In FIG. 1, a plurality of downstream connection ports 106*a*, 106*b* are connected to a plurality of peripheral devices 116*a*, 116*b*, 116*c* respectively. A plurality of downstream control circuits 108*a*, 108*b*, 108*c*, 108*d* are connected to the USB controller 102 and the downstream connection ports 106*a*, 106*b*, 106*c* wherein the downstream control circuits 108*a*, 108*b*, 108*c*, 108*d*, either transmits or receive the received or transmitted information of the upstream control circuit 104 by way of the downstream connection ports 106*a*, 106*b*, 106*c*. The switch module 110 is connected to the dynamic connection ports 100*a*, 100*b*, the USB controller 102, the upstream control circuit 104, the downstream connection ports 106*a*, 106*b*, 106*c* and the downstream control circuits 108*a*, 108*b*, 108*c*, 108*d*. When the USB controller 102 detects that the host unit 114 is not connected to another 100*b* of the at least two different types of dynamic connection ports 100*a*, 100*b*, the switch module 110 switches the another dynamic connection port 100*b* disconnected from the host unit 114 to another connection port and the another dynamic connection port 100*b* is capable of connecting to one 108*d* of the downstream control circuits 108*a*, 108*b*, 108*c*, 108*d* to allow the another dynamic connection port 100*b* to be connected to another peripheral device 116.

In one embodiment of FIG. 1, the dynamic connection ports 100*a*, 100*b* of the USB hub 101 comprise a standard type-A connection port and a type-C connection port which are compatible to a USB protocol and the USB controller 102 does not configure the dynamic connection ports 100*a*, 100*b* to be the standard type-A connection port or the type-C connection port in advance. In another case, the dynamic connection ports 100*a*, 100*b* comprise a standard type-A connection port and a type-C connection port which are compatible to a USB protocol and the USB controller 102 configures the dynamic connection ports 100*a*, 100*b* to be the standard type-A connection port and/or the type-C connection port in advance. In other words, the dynamic connection ports 100*a*, 100*b* of the USB hub 101 in the present invention are composed of at least two types of ports comprising standard type-A connection port and the type-C connection port, which are compatible to USB protocol so that the USB controller 102 of the USB hub 101 finds the types of dynamic connection ports 100*a*, 100*b*.

Afterwards, in one embodiment of FIG. 1, when the USB controller 102 detects that the host unit 114 is not connected to another 100*b* of the at least two different types of dynamic connection ports 100*a*, 100*b*, the switch module 110 switches the another dynamic connection port 100*b* disconnected from the host unit 114 to another connection port and the another dynamic connection port 100*b* is capable of connecting to one 108*d* of the downstream control circuits 108*a*, 108*b*, 108*c*, 108*d* to allow the another dynamic connection port 100*b* to be connected to another peripheral device 116, and vice versa. When the USB controller 102 detects that the host unit 114 is not connected to another 100*a* of the at least two different types of dynamic connection ports 100*a*, 100*b*, the switch module 110 switches the another dynamic connection port 100*a* disconnected from the host unit 114 to another connection port and the another dynamic connection port 100*b* is capable of connecting to one 108*d* of the downstream control circuits 108*a*, 108*b*, 108*c*, 108*d* to allow the another dynamic connection port 100*b* to be connected to another peripheral device 116.

In another case, when the USB controller 102 detects that the power level of each dynamic connection port 100*a*, 100*b* is greater than the predetermined level, the USB controller 102 disables the upstream control circuit 104 and the downstream control circuits 108*a*, 108*b*, 108*c*, 108*d* for inactivating the downstream control circuits 106*a*, 106*b*, 106*c* not to transmit or receive the information from the upstream control circuit 104. In other words, when two dynamic connection ports 100*a*, 100*b* are connected to the host unit 114 simultaneously, the USB hub 101 for connecting different port types employs an indication device 111 connected to the USB controller 102 for indicating the dynamic connection ports 100*a*, a00*b* of the USB hub 101 in an error status. The USB controller 102 is capable of assigning one of the dynamic connection ports 100*a*, 100*b* as a connection port to be connected to the host unit 114.

Moreover, in one embodiment of FIG. 1, the power level is a level value of a VBUS pin defined by a USB interface of the host unit 114. That is, the VBUS pin of the host unit 114 is connected to the dynamic connection ports 100*a*, 100*b* of the USB hub 101 via the power pin 118 of the connection wire 112 so that the USB controller 102 is capable of detecting the power level of the power pin 118 to determine which dynamic connection port 100*a* or 100*b* is connected to the host unit 114.

Based on the above-mentioned descriptions, the present invention provides a USB hub for connecting different port types and method thereof by detecting a power level of each dynamic connection port to determine whether the power level of the one of at least two different types of dynamic connection ports connected to the host unit is greater than a predetermined level. The dynamic connection port connected to the host unit is defined as a upstream connection port and another dynamic connection port disconnected from the host unit is defined as a downstream connection port for the peripheral device. In another case, the USB controller selectively disables the dynamic connection port disconnected from the host unit for improving the utilization flexibility of the connection wire between the hub device and host unit.

Figure 2:
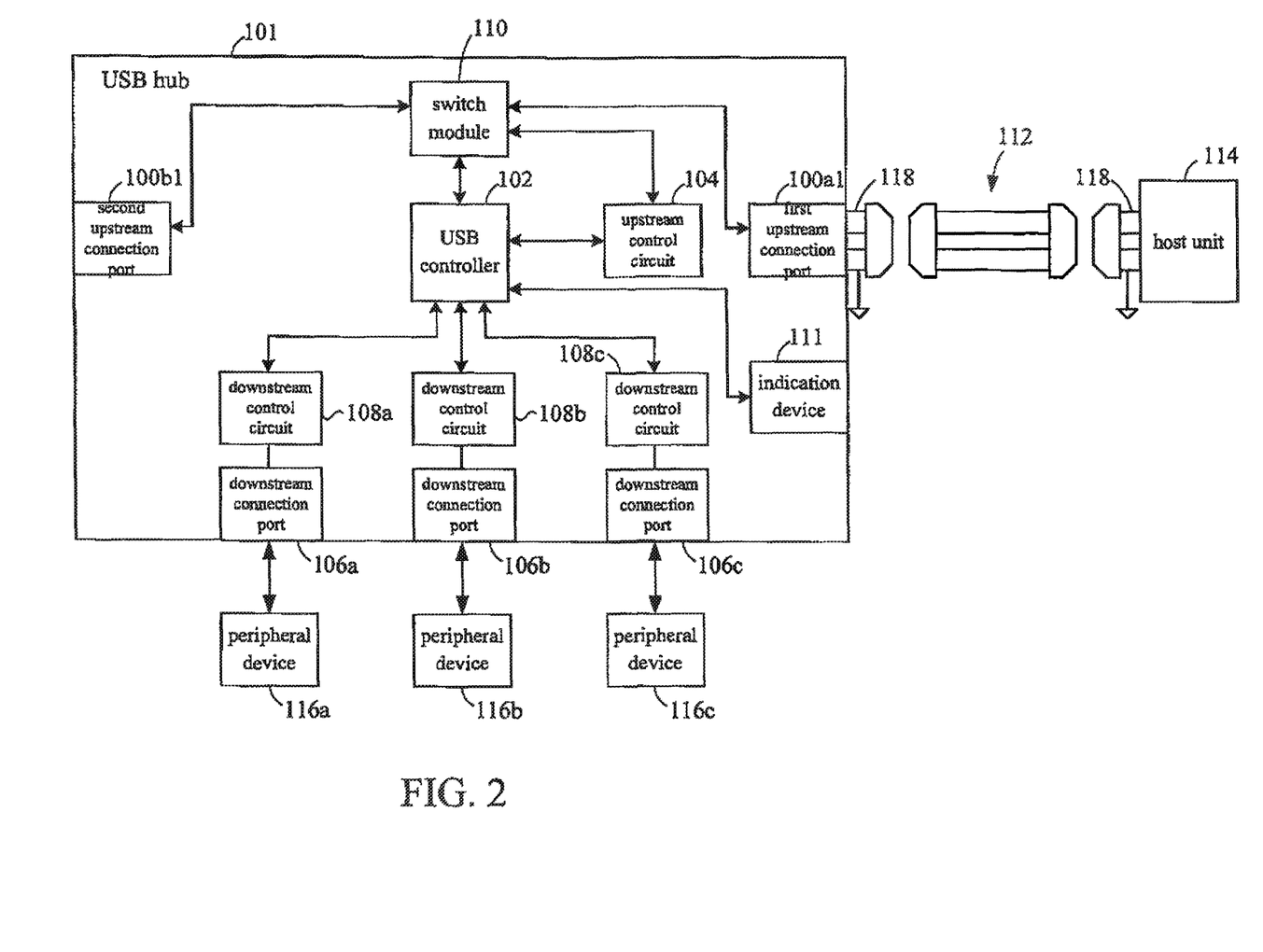
FIG. 2 is a schematic block diagram of a USB hub for connecting different port types according to a second embodiment of the present invention.

Refer to FIG. 2, which is a schematic block diagram of a USB hub 101 for connecting different port types according to a second embodiment of the present invention. The USB hub 101 comprises a first upstream connection port 100*a*1, a second upstream connection port 100*b*1, USB controller 102, a upstream control circuit 104, a plurality of downstream connection ports, 106a, 106b, 106c, a plurality of downstream control circuits 108a, 108b, 108c, a switch module 110 and an indication device 111. One of the first upstream connection port 100a1 and the second upstream connection port 100b1 in the USB hub 101 is connected to the host unit 114 via a connection wire 112. The USB controller 102 is connected to the upstream control circuit 104, the downstream control circuits 108a, 108b, 108c, the switch module 110 and the indication device 111.

In FIG. 2, the first upstream connection port 100a1 comprises a first type of port interface coupled to a host unit 114 and the second upstream connection port 100b1 comprises a second type of port interface which is different from the first type of port interface and is coupled to the host unit 114. The USB controller 102 is connected to the first upstream connection port 100a1 and the second upstream connection port 100b1 for detecting a plurality of power levels of the first upstream connection port 100a1 and the second upstream connection port 100b1 respectively to determine whether the power levels of the first upstream connection port 100a1 and the second upstream connection port 100b1 connected to the host unit 114 is greater than a predetermined level.

The upstream control circuit 104 is connected to the USB controller 102 and the first upstream connection port 100a1 and the second upstream connection port 100b1 connected to the host unit 114, wherein the USB controller 102 controls the first upstream connection port 100a1 and the second upstream connection port 100b1 connected to the host unit 114 for either receiving information from the host unit 114 or transmitting information to the host unit 114 and analyzes the received information. A plurality of downstream connection ports 106a, 106b, 106c are connected to a plurality of peripheral devices 116 respectively. A plurality of downstream control circuits 108a, 108b, 108c are connected to the USB controller 102 and the downstream connection ports 106a, 106b, 106c, wherein the downstream control circuits 108a, 108b, 108c either transmits or receive the received or transmitted information of the upstream control circuit 104 by way of the downstream connection ports 106a, 106b, 106c. The switch module 110 is connected to the first upstream connection port 100a1 and the second upstream connection port 100b1 and the USB controller 102, wherein when the USB controller 102 detects that the host unit 114 is not connected to the first upstream connection port 100a1, the switch module 110 switches the upstream control circuit 104 to be connected to the first upstream connection port 100a1 which is connected to the host unit 114. In one embodiment, the power level is a level value of a VBUS pin defined by a USB interface of the host unit 114. In one embodiment, when the USB controller 102 confirms that the second upstream connection port 100b1 is disconnected from the host unit 114, the switch module 110 disables the second upstream connection port 100b1 to inactivate the second upstream connection port 100b1.

Figure 3:
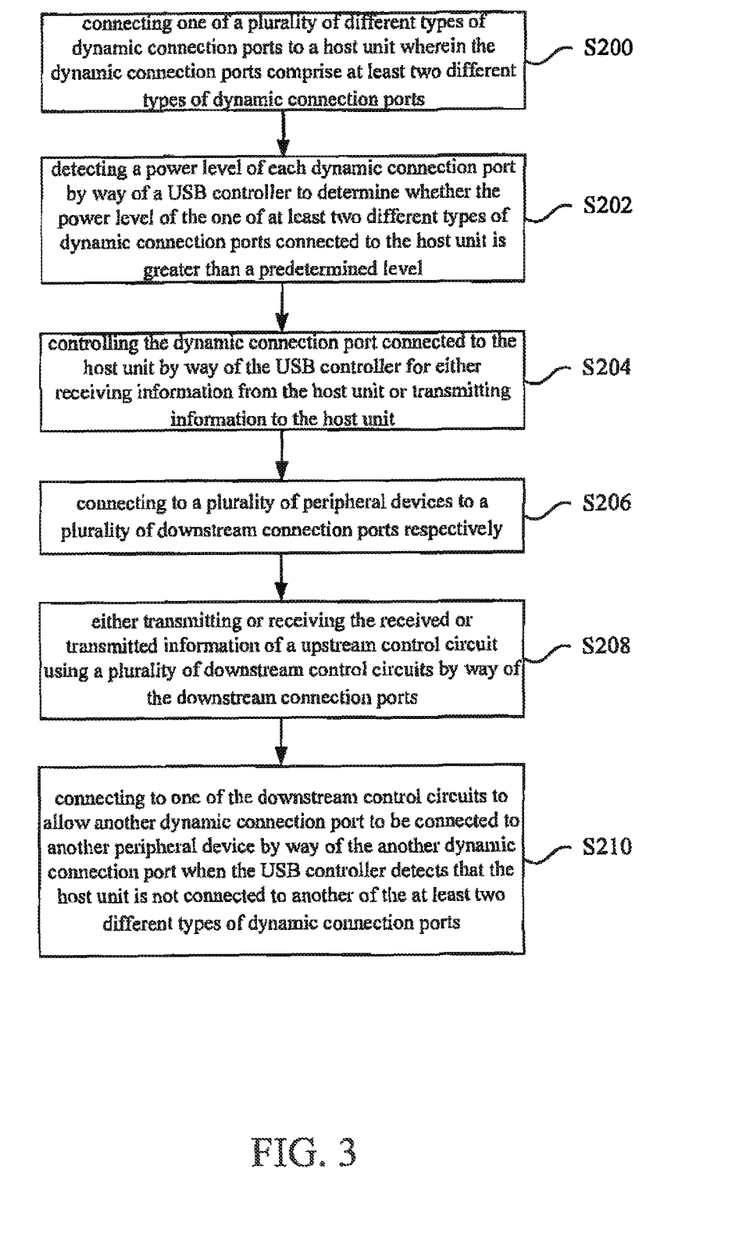
FIG. 3 is a flow chart of a connection method of USB hub to connect different port types according to one embodiment of the present invention.

Refer to FIG. 1 and FIG. 3. FIG. 3 is a flow chart of a connection method of USB hub 101 to connect different port types according to one embodiment of the present invention. The connection method of USB hub to connect different port types comprises the following steps.

In step S200, one of a plurality of different types of dynamic connection ports is connected to a host unit wherein the dynamic connection ports comprise at least two different types of dynamic connection ports. In one embodiment, during the step S200 of connecting one of a plurality of different types of dynamic connection ports to the host unit, the USB controller is capable of assigning one of the dynamic connection ports as a connection port to be connected to the host unit. In another embodiment, during the step S200 of connecting one of a plurality of different types of dynamic connection ports to the host unit, the USB controller does not assign one of the dynamic connection ports as a connection port to be connected to the host unit.

In one embodiment, during the step S202 of connecting one of a plurality of different types of dynamic connection ports to the host unit, the dynamic connection ports comprise a standard type-A connection port and a type-C connection port which are compatible to a USB protocol and the USB controller does not configure the dynamic connection ports to be the standard type-A connection port or the type-C connection port in advance.

In step S202, a USB controller detects a power level of each dynamic connection port to determine whether the power level of the one of at least two different types of dynamic connection ports connected to the host unit is greater than a predetermined level. The power level is a level value of a VBUS pin defined by a USB interface of the host unit.

In step S204, the USB controller controls the dynamic connection port connected to the host unit for either receiving information from the host unit or transmitting information to the host unit.

In step S206, a plurality of peripheral devices is connected to a plurality of downstream connection ports respectively.

In step S208, a plurality of downstream control circuits either transmit or receive the received or transmitted information of an upstream control circuit by way of the downstream connection ports.

In step S210, the switch module switches the another dynamic connection port disconnected from the host unit to another connection port and the another dynamic connection port is capable of connecting to one of the downstream control circuits to allow another dynamic connection port to be connected to another peripheral device by way of the another dynamic connection port when the USB controller detects that the host unit is not connected to another of the at least two different types of dynamic connection ports. In one embodiment, during the step S210 of detecting the power level of each dynamic connection port by way of the USB controller, when the USB controller detects that the power level of each dynamic connection port is greater than the predetermined level, the USB controller disables the upstream control circuit and the downstream control circuits for inactivating the downstream control circuits not to transmit or receive the information from the upstream control circuit. In one case, during the step of disabling the upstream control circuit and the downstream control circuits by the USB controller, an indication device indicates the dynamic connection ports of the USB hub in an error status. In another embodiment, when the USB controller confirms that the another dynamic connection port is disconnected from the host unit, the switch module disables the another dynamic connection port to inactivate the another dynamic connection port.

According to the above-mentioned descriptions, the present invention provides a USB hub for connecting different port types and method thereof by detecting a power level of each dynamic connection port to determine whether the power level of the one of at least two different types of dynamic connection ports connected to the host unit is greater than a predetermined level. The dynamic connection port connected to the host unit is defined as a upstream connection port and another dynamic connection port disconnected from the host unit is defined as a downstream connection port for the peripheral device. In another case, the USB controller selectively disables the dynamic connection port disconnected from the host unit for improving the utilization flexibility of the connection wire between the hub device and host unit.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A universal serial bus (USB) hub for connecting different port types, the USB hub comprising:
    a plurality of dynamic connection ports comprising at least two different types of dynamic connection ports wherein one of at least two different types of dynamic connection ports is used to connect to a host unit;
    a USB controller connected to the dynamic connection ports, for detecting a power level of each dynamic connection port to determine whether the power level of the one of at least two different types of dynamic connection ports connected to the host unit is greater than a predetermined level;
    a upstream control circuit connected to the USB controller and the dynamic connection port connected to the host unit, wherein the USB controller controls the dynamic connection port connected to the host unit for either receiving information from the host unit or transmitting information to the host unit and analyzes the received information;
    a plurality of downstream connection ports, for being connected to a plurality of peripheral devices respectively;
    a plurality of downstream control circuits connected to the USB controller and the downstream connection ports, wherein the downstream control circuits either transmits or receive the received or transmitted information of the upstream control circuit by way of the downstream connection ports; and
    a switch module connected to the dynamic connection ports, the USB controller, the upstream control circuit, the downstream connection ports and the downstream control circuits, wherein when the USB controller detects that the host unit is not connected to another of the at least two different types of dynamic connection ports, the switch module switches the another dynamic connection port disconnected from the host unit to another connection port and the another dynamic connection port is capable of connecting to one of the downstream control circuits to allow the another dynamic connection port to be connected to another peripheral device;
    wherein when the USB controller detects that the power level of each of the at least two different types of dynamic connection ports is greater than the predetermined level, the USB controller disables the upstream control circuit and the downstream control circuits for inactivating the downstream control circuits not to transmit or receive the information from the upstream control circuit.

2. The USB hub for connecting different port types of claim 1, wherein the dynamic connection ports comprise a standard type-A connection port and a type-C connection port which are compatible to a USB protocol and the USB controller does not configure the dynamic connection ports to be the standard type-A connection port or the type-C connection port in advance.

3. The USB hub for connecting different port types of claim 1, wherein the dynamic connection ports comprise a standard type-A connection port and a type-C connection port which are compatible to a USB protocol and the USB controller configures the dynamic connection ports to be the standard type-A connection port and/or the type-C connection port in advance.

4. The USB hub for connecting different port types of claim 1, further comprising an indication device connected to the USB controller for indicating the dynamic connection ports of the USB hub in an error status.

5. The USB hub for connecting different port types of claim 1, wherein the USB controller is capable of assigning one of the dynamic connection ports as a connection port to be connected to the host unit.

6. The USB hub for connecting different port types of claim 1, wherein the power level is a level value of a VBUS pin defined by a USB interface of the host unit.

7. The USB hub for connecting different port types of claim 1, wherein when the USB controller confirms that the another dynamic connection port is disconnected from the host unit, the switch module disables the another dynamic connection port to inactivate the another dynamic connection port.

8. A USB hub for connecting different port types, the USB hub comprising:
    a first upstream connection port comprising a first type of port interface coupled to a host unit;
    a second upstream connection port comprising a second type of port interface which is different from the first type of port interface and is coupled to the host unit;
    a USB controller connected to the first upstream connection port and the second upstream connection port, for detecting a plurality of power levels of the first upstream connection port and the second upstream connection port respectively to determine whether the power levels of the first upstream connection port and the second upstream connection port connected to the host unit is greater than a predetermined level;
    a upstream control circuit connected to the USB controller and the first upstream connection port and the second upstream connection port connected to the host unit, wherein the USB controller controls the first upstream connection port and the second upstream connection port connected to the host unit for either receiving information from the host unit or transmitting information to the host unit and analyzes the received information;
    a plurality of downstream connection ports, for being connected to a plurality of peripheral devices respectively;
    a plurality of downstream control circuits connected to the USB controller and the downstream connection ports, wherein the downstream control circuits either transmits or receive the received or transmitted information of the upstream control circuit by way of the downstream connection ports; and
    a switch module connected to the first upstream connection port and the second upstream connection port and the USB controller, wherein when the USB controller detects that the host unit is not connected to the first upstream connection port, the switch module switches the upstream control circuit to be connected to the first upstream connection port which is connected to the host unit;

wherein when the USB controller detects that the power levels of the first upstream connection port and the second upstream connection port are greater than the predetermined level, the USB controller disables the upstream control circuit and the downstream control circuits for inactivating the downstream control circuits not to transmit or receive the information from the upstream control circuit.

9. The USB hub for connecting different port types of claim 8, wherein the first upstream connection port and the second upstream connection port respectively comprise a standard type-A connection port and a type-C connection port which are compatible to a USB protocol and the USB controller does not configure the first upstream connection port and the second upstream connection port to be the standard type-A connection port or the type-C connection port in advance.

10. The USB hub for connecting different port types of claim 8, wherein the first upstream connection port and the second upstream connection port respectively comprise a standard type-A connection port and a type-C connection port which are compatible to a USB protocol and the USB controller configures the dynamic connection ports to be the standard type-A connection port and/or the type-C connection port in advance.

11. The USB hub for connecting different port types of claim 8, further comprising an indication device connected to the USB controller for indicating the dynamic connection ports of the USB hub in an error status.

12. The USB hub for connecting different port types of claim 8, wherein the USB controller is capable of assigning one of the first upstream connection port and the second upstream connection port as a connection port to be connected to the host unit.

13. The USB hub for connecting different port types of claim 8, wherein the power level is a level value of a VBUS pin defined by a USB interface of the host unit.

14. The USB hub for connecting different port types of claim 8, wherein when the USB controller confirms that the second upstream connection port is disconnected from the host unit, the switch module disables the second upstream connection port to inactivate the second upstream connection port.

15. A connection method of USB hub to connect different port types, the connection method comprising the steps of:

connecting one of a plurality of different types of dynamic connection ports to a host unit wherein the dynamic connection ports comprise at least two different types of dynamic connection ports;

detecting a power level of each dynamic connection port by way of a USB controller to determine whether the power level of the one of at least two different types of dynamic connection ports connected to the host unit is greater than a predetermined level;

controlling the dynamic connection port connected to the host unit by way of the USB controller for either receiving information from the host unit or transmitting information to the host unit;

connecting to a plurality of peripheral devices to a plurality of downstream connection ports respectively;

either transmitting or receiving the received or transmitted information of a upstream control circuit using a plurality of downstream control circuits by way of the downstream connection ports; and connecting to one of the downstream control circuits to allow another dynamic connection port to be connected to another peripheral device by way of the another dynamic connection port when the USB controller detects that the host unit is not connected to another of the at least two different types of dynamic connection ports;

wherein during the step of detecting the power level of each dynamic connection port by way of the USB controller, when the USB controller detects that the power level of each dynamic connection port is greater than the predetermined level, the USB controller disables the upstream control circuit and the downstream control circuits for inactivating the downstream control circuits not to transmit or receive the information from the upstream control circuit.

16. The connection method of USB hub to connect different port types of claim 15, wherein during the step of connecting one of a plurality of different types of dynamic connection ports to the host unit, the dynamic connection ports comprise a standard type-A connection port and a type-C connection port which are compatible to a USB protocol and the USB controller does not configure the dynamic connection ports to be the standard type-A connection port or the type-C connection port in advance.

17. The connection method of USB hub to connect different port types of claim 15, wherein during the step of connecting one of a plurality of different types of dynamic connection ports to the host unit, the dynamic connection ports comprise a standard type-A connection port and a type-C connection port which are compatible to a USB protocol and the USB controller configures the dynamic connection ports to be the standard type-A connection port and/or the type-C connection port in advance.

18. The connection method of USB hub to connect different port types of claim 15, during the step of disabling the upstream control circuit and the downstream control circuits by the USB controller, further comprising a step of indicating the dynamic connection ports of the USB hub in an error status by way of an indication device.

19. The connection method of USB hub to connect different port types of claim 15, wherein during the step of connecting one of a plurality of different types of dynamic connection ports to the host unit, the USB controller is capable of assigning one of the dynamic connection ports as a connection port to be connected to the host unit.

20. The connection method of USB hub to connect different port types of claim 15, wherein the power level is a level value of a VBUS pin defined by a USB interface of the host unit.

21. The connection method of USB hub to connect different port types of claim 15, wherein when the USB controller confirms that the another dynamic connection port is disconnected from the host unit, the switch module disables the another dynamic connection port to inactivate the another dynamic connection port.

* * * * *